United States Patent
Doty et al.

(10) Patent No.: US 10,494,805 B2
(45) Date of Patent: Dec. 3, 2019

(54) BROKEN WATER CLOSET RING REPAIR DEVICE

(71) Applicants: David B. Doty, Oklahoma City, OK (US); Robert Britt Taylor, Rocky Mount, NC (US)

(72) Inventors: David B. Doty, Oklahoma City, OK (US); Robert Britt Taylor, Rocky Mount, NC (US)

( * ) Notice: Subject to any disclaimer, the term of this patent is extended or adjusted under 35 U.S.C. 154(b) by 0 days.

(21) Appl. No.: 15/956,871

(22) Filed: Apr. 19, 2018

(65) Prior Publication Data
US 2018/0305915 A1 Oct. 25, 2018

Related U.S. Application Data

(60) Provisional application No. 62/488,716, filed on Apr. 22, 2017.

(51) Int. Cl.
*E03D 11/17* (2006.01)
*F16L 23/00* (2006.01)
*E03D 11/16* (2006.01)

(52) U.S. Cl.
CPC .............. *E03D 11/17* (2013.01); *E03D 11/16* (2013.01); *F16L 23/006* (2013.01)

(58) Field of Classification Search
CPC ...................................... E03D 11/17
USPC .......................................... 4/252.1
See application file for complete search history.

(56) References Cited

U.S. PATENT DOCUMENTS

| | | |
|---|---|---|
| 556,489 A | 3/1896 | Coburn |
| 572,575 A | 12/1896 | Scott |
| 630,641 A | 8/1899 | Albree |
| 773,734 A | 11/1904 | Griffiths |
| 776,971 A | 12/1905 | Walsh |
| 903,280 A | 11/1908 | Farrell |
| 939,001 A | 11/1909 | Forster et al. |
| 990,646 A | 4/1911 | Fisher |
| 1,019,766 A | 3/1912 | Cronk |
| 1,031,531 A | 7/1912 | Cramer |
| 1,333,368 A | 3/1920 | Auer |
| 1,505,683 A | 8/1924 | Wyatt et al. |

(Continued)

OTHER PUBLICATIONS

Culwell Flange; "Protect. Prevent. Save." Retrieved on Mar. 30, 2017 from https://media.wix.com/ugd/aef8f9_356fbf1e98bb4b648b6fb2f34cfa7d8a.pdf.

(Continued)

*Primary Examiner* — Lori L Baker
(74) *Attorney, Agent, or Firm* — Robert H. Frantz

(57) ABSTRACT

A water closet flange repair or reinforcement device has an upper portion of an arcuate shape of less than or equal to a semi-circle, with an outer circumference and an inner circumference; a lower portion substantially parallel to the upper portion, having an outer circumference equal to the outer circumference of the upper portion; a side portion along the outer circumferences of the upper and lower portions, defining a squared C-shaped channel between the top, side, and bottom portions of a pre-determined interior height to receive a water closet flange; and bendable tabs extending from the inner circumference on the upper portion, each tab having a first position co-planar with the upper portion and having a second bent position providing a mechanical retention within an inside volume of a water closet flange captured within the C-shaped channel.

16 Claims, 5 Drawing Sheets

(56) References Cited

U.S. PATENT DOCUMENTS

| | | | |
|---|---|---|---|
| 1,613,926 | A | 1/1927 | Bropson |
| 1,784,667 | A | 12/1930 | Gillet |
| 2,082,348 | A | 6/1937 | Le Tarte |
| 2,911,239 | A | 11/1959 | Marzolf, Sr. |
| 3,108,818 | A | 10/1963 | Furstenburg |
| 3,140,104 | A | 7/1964 | Cosper |
| 3,761,114 | A | 9/1973 | Blakeley |
| 3,775,780 | A | 12/1973 | McEwen |
| 3,967,836 | A | 7/1976 | Izzi, Sr. |
| 4,352,652 | A | 10/1982 | Barber |
| 4,886,302 | A | 12/1989 | Forbes |
| 5,153,947 | A | 10/1992 | Markles |
| 5,220,694 | A | 6/1993 | Knorovsky |
| 5,246,255 | A | 9/1993 | Forbes et al. |
| 5,309,579 | A | 5/1994 | Nelson |
| 5,335,849 | A | 8/1994 | Forbes |
| 5,492,372 | A | 2/1996 | Dranberg |
| 5,890,239 | A | 4/1999 | Hite |
| 6,155,606 | A | 12/2000 | Phillips |
| 6,435,563 | B2 | 8/2002 | Phillips |
| 6,442,769 | B1 | 9/2002 | Phillips |
| D474,265 | S | 5/2003 | Love et al. |
| D477,658 | S | 7/2003 | Love et al. |
| D647,181 | S | 10/2011 | Kovach |
| 8,505,124 | B2 | 8/2013 | Eichler et al. |
| 8,955,172 | B2 | 2/2015 | Culwell |
| 2001/0050482 | A1 | 12/2001 | Phillips |

OTHER PUBLICATIONS

Danco; "Hydroseat Installation Instructions", Copyright 2015.
Superior Tool; "Super Ring [TM]"; retrieved Mar. 30, 2017 from http://www.superiortool.com/Speciality/superRing.html.

BROKEN WATER CLOSET RING REPAIR DEVICE

FIELD OF THE INVENTION

This patent application claims benefit of the filing date of U.S. provisional patent application 62/488,716, filed on Apr. 22, 2017. The invention generally relates to devices for mounting and securing a toilet to a water closet ring which has a portion damaged, missing or broken.

BACKGROUND OF INVENTION

Water closet rings, also referred to as a water closet coupling or water closet flange, provide two bolt mounting holes which allow coupling of the base of a toilet to the inlet of a drainpipe. These rings, couplings or flanges can be fabricated of cast iron, stamped sheet metal, or even plastic (e.g., polyvinyl chloride or "PVC"). Plumbers often must re-mount a toilet to a water closet ring which is damaged or broken. One option is to replace the water closet ring itself, but this can be time consuming and costly as it may require removal of a concrete foundation or other flooring to access the drainpipe.

SUMMARY OF EXEMPLARY EMBODIMENTS OF THE INVENTION

A water closet flange repair or reinforcement device is disclosed which has an upper portion of an arcuate shape of less than or equal to a semi-circle, with an outer circumference and an inner circumference; a lower portion substantially parallel to the upper portion, having an outer circumference equal to the outer circumference of the upper portion; a side portion along the outer circumferences of the upper and lower portions, defining a squared C-shaped channel between the top, side, and bottom portions of a pre-determined interior height to receive a water closet flange; and bendable tabs extending from the inner circumference on the upper portion, each tab having a first position co-planar with the upper portion and having a second bent position providing a mechanical retention within an inside volume of a water closet flange captured within the C-shaped channel.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Replacement of a broken water closet flange or ring can be costly and time consuming, often requiring chiseling away a portion of a concrete slab foundation which surrounds the drainpipe. Existing flange repair devices each have shortcomings, the most notable of which is that they require a full-circle device to fully wrap around the drainpipe, and some require at least one half (one side) of the flange to be in operable condition.

The present inventor has devised a device which is simple to use, can allow for just one half of a flange to be repaired without wasting the other half of a repair ring, and can be used on a water closet flange which has damage to both bolt mounting sides of the flange, not just one side.

Figure 2:
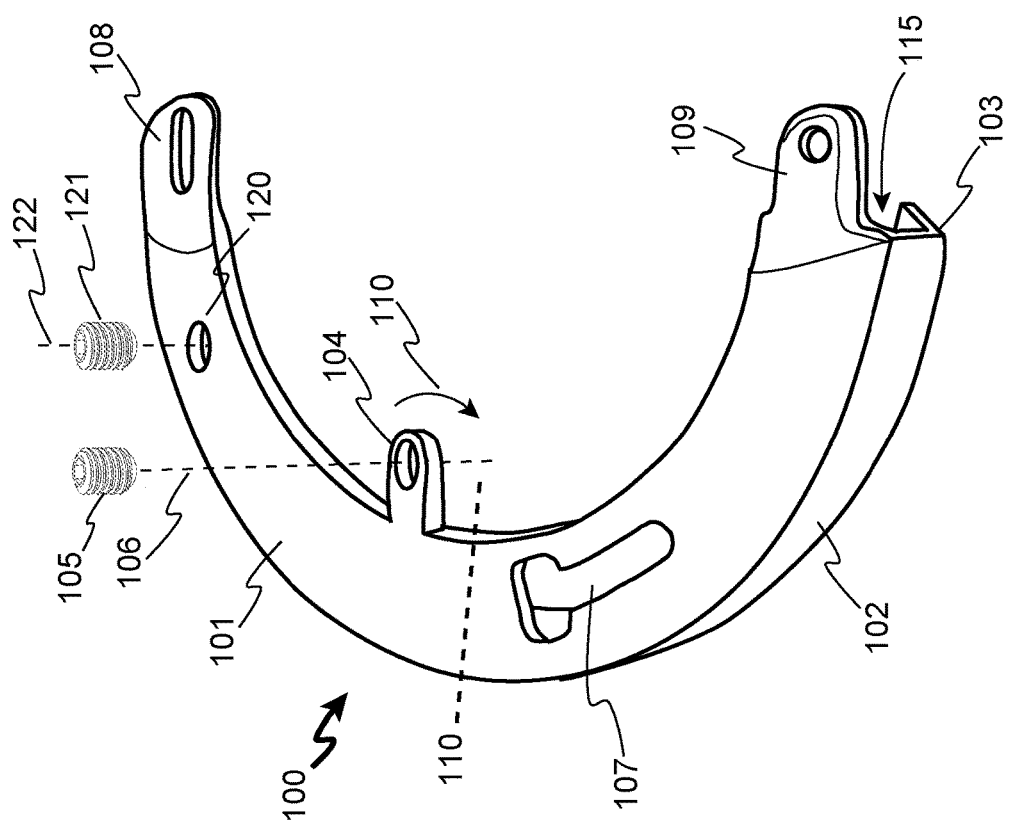
FIG. 2 illustrates the embodiment of FIG. 1 prior to installation on a water closet flange.

Referring first to FIG. 2, a semi-circular device (100) is shown for attachment to a broken water closet flange. It includes a substantially flat top portion (101), a substantially flat side portion (102), and a substantially flat bottom portion (103) in a generally C-shaped configuration defining a flange capture gap (115) between the top portion and the bottom portion. The top portion preferably adjoins the side portion at a substantially right angle, and the bottom portion also preferably adjoins the side portion at a substantially right angle, thereby creating a rectangular capture gap with the top and bottom portions substantially parallel to each other. The capture gap height may is preferably designed to provide a snug, friction fit around and capture a particular style of water closet flange, such as a cast iron flange or PVC flange. A nominal gap of 7/16" in practice accommodates most flanges in use today, but flanges of other thicknesses are a possibility, so various embodiments of the present invention may provide alternative capture gaps. And, in at least one embodiment, the distance the bottom portion extends from the side portion is less than the distance the top portion extends from the side portion so that the bottom portion avoids contacting or relying upon any shoulder than might be formed between the water closet flange and the top of the drainpipe.

The top portion also has at least one T-shaped slot (107) for receiving a closet bolt suitable for extending upward towards (and eventually through) the base of a toilet. Both ends (109, 108) are preferably provided with couplers which can mate with another similar unit to provide a full-circle repair ring.

Additionally, embodiments of the present invention include a bendable tab (104) extending towards the center of the semi-circular device (100) from the top portion, which can be bent by rotating downward force (110) to retain the semi-circular ring onto the water closet flange. A grub screw (105) is preferably threaded through (106) a screw hole in the tab (104), before or after bending, and driven until it contacts and presses into an interior surface of the flange and drainpipe. Similarly, a grub screw (121) may be received (122) through a threaded hole (120) formed in the top portion, allowing it to be driven down through the top portion until it contacts the flange of the drainpipe to place the device (100) into a friction fit with the flange to prevent movement of the device.

Figure 1:
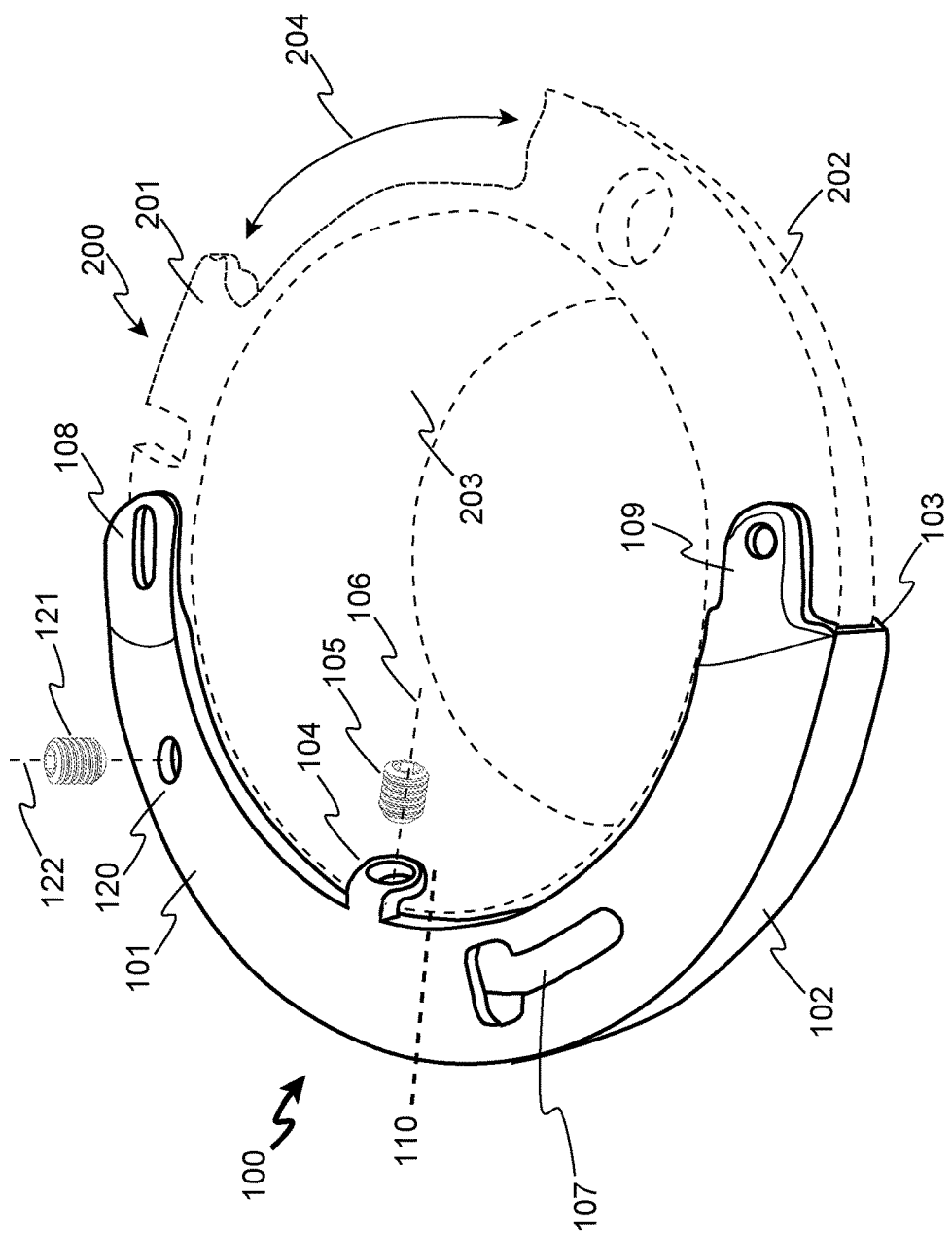
FIG. 1 shows a semi-circular embodiment of the present invention installed on a water closet flange.

FIG. 1 shows a water closet ring (200) with a broken portion (204). In this view, a single, semi-circular repair device (100) been slid onto a water closet flange (200) before the tab (104) has been bent downward (e.g., with the tab extending in a plane with the top portion (101)). The top portion (101) of the repair device makes contact with the top portion (201) of the water closet flange, then bottom portion (103) of the repair device (100) makes contact with the bottom portion of the water closet flange, and the side portion (102) of the repair device comes into contact after sliding it on with the outer surface (202) of the flange, thereby capturing the flange in the gap (115). After sliding the device (100) onto the flange (200), the tab (104) is bent downwards, such as by hand or tool, and optionally, a grub screw can be received through the tab and advanced until it contacts and presses into the inner surface (203) of the flange or drainpipe.

If only one half of the flange is broken, then the repair is complete, an a second device (100) is not needed, thereby saving half of the repair device cost. If both sides of the flange are broken, then a second, similar repair device (100) is installed from the opposite side of the water closet flange (200), and optionally the ends (108, 109) of the devices are attached to each other to further secure the two devices into a unitary mechanical ring.

Figure 3:
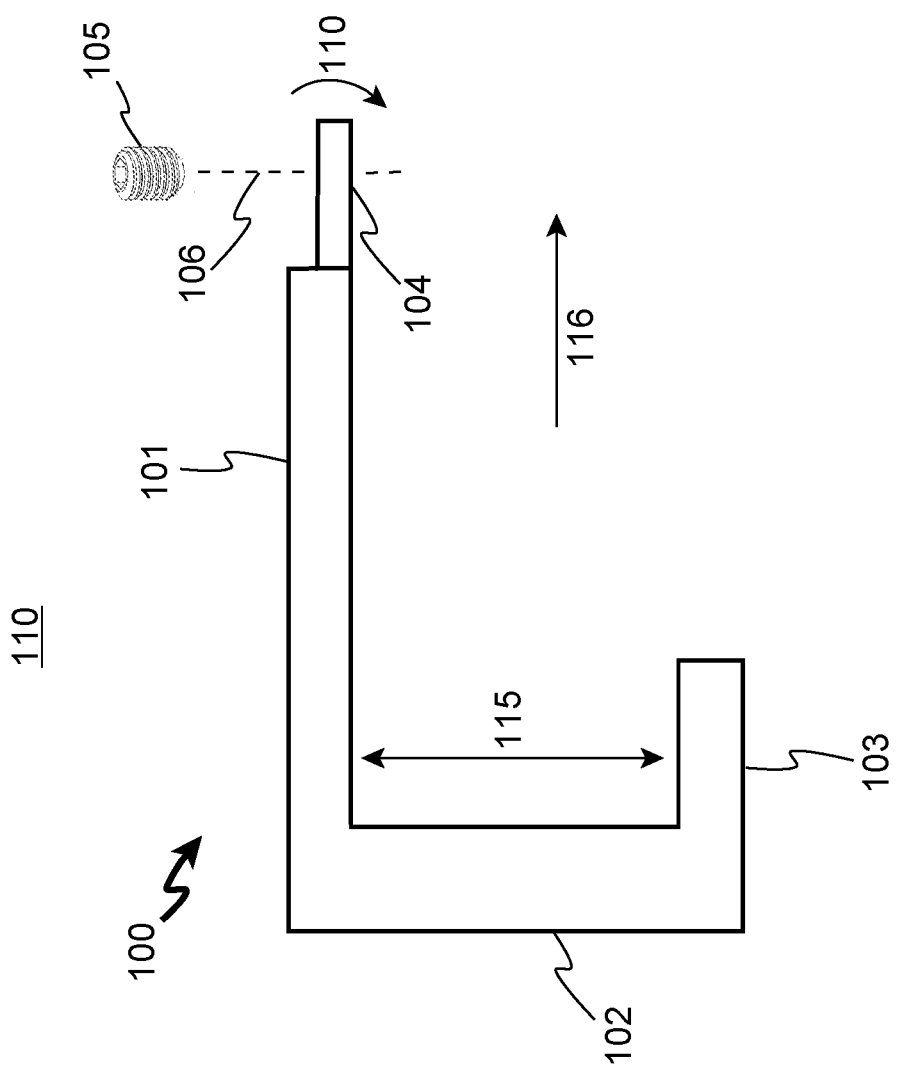
FIG. 3 depicts a cross-sectional view of the device of FIG. 1 ready to install.
Figure 4:
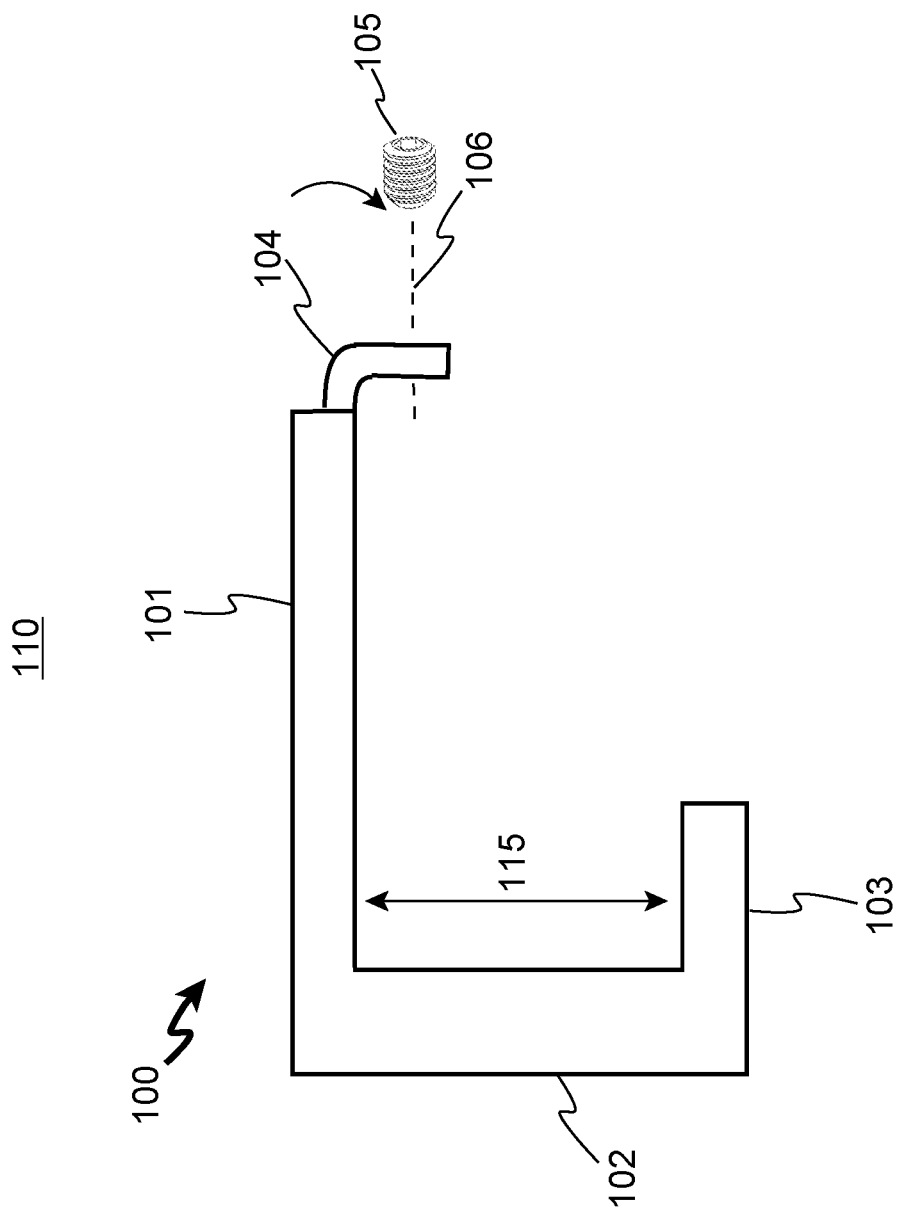
FIG. 4 shows a cross-sectional view of the device of FIG. 1 with the tab bent downward.

Turning now to FIG. 3, the cross-sectional view (110) of the repair device (100) is shown, in which the top (101), side (102) and bottom portions (103) form a capture gap (115) of a suitable dimension to receive a flange of a specific type, such as case iron, PVC or sheet metal. In this view, the tab (104) is shown in the position suitable for installing the device by sliding (116) it onto a water closet flange, wherein the flange is received into the gap (115). Then, the tab is bent (110) downward as shown in FIG. 4 to capture the flange and retain the device (100) onto the flange by preventing it from slipping off in the opposite direction of the installation direction (115).

Figure 5:
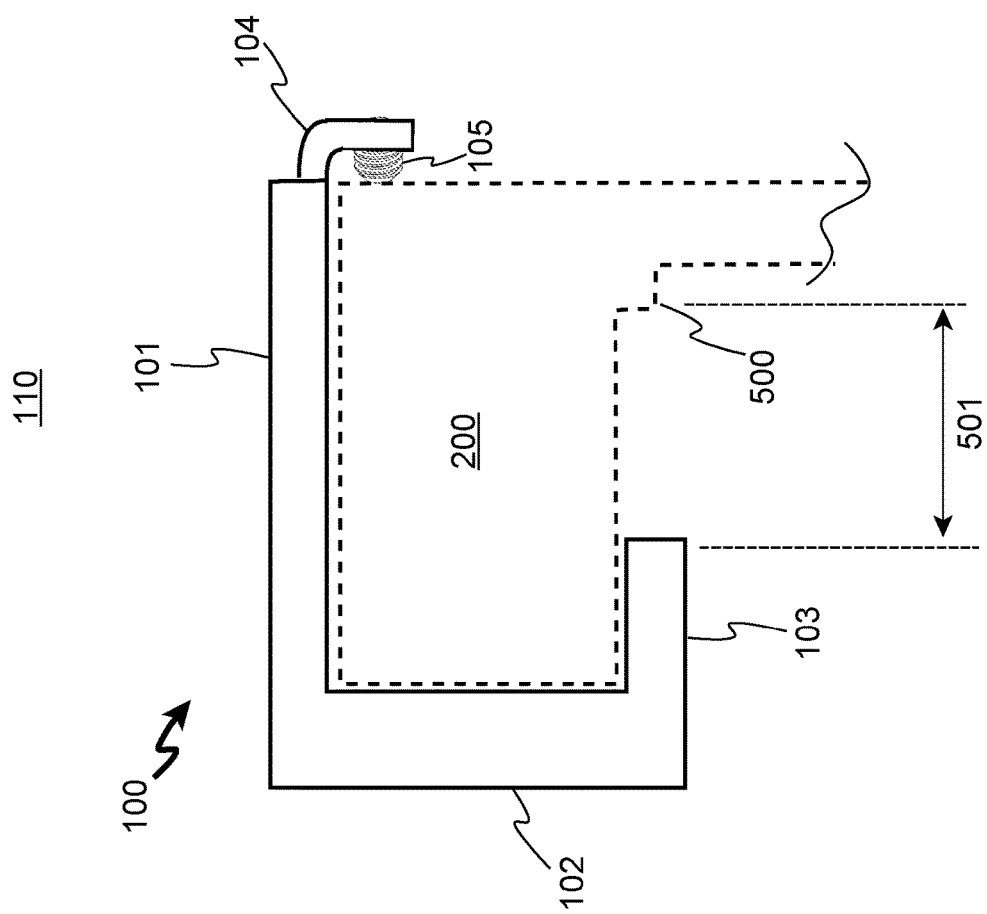
FIG. 5 shows a cross-sectional view of the device of FIG. 1 with the tab bent downward, capturing a water closet flange.

FIG. 5 shows the cross-sectional view of a fully-installed semi-circular repair device (100) with the optional grub screw (105) driven into contact with the inner surface of the water closet flange (200) and/or drainpipe. From this view, one can see that without the grub screw, the tab (104) can still serve as a retainer for the device (100) by bending the tab even further towards the water closet flange (200) until the tab comes into contact with the inner surface of the flange, if desired.

FIG. 5 also shows a detail of at least one embodiment in which the lower portion (103) extends under the water closet flange (200), but not so much (501) that the inner circumference of lower portion would make contact with a shoulder (500) formed under the flange (200) and along the drainpipe. Similarly, the grub screw (121) received through the top portion may be included in some embodiments.

It should be noted that more than one tab (104) can be provided to the repair device in some embodiments. For example, a plurality of bendable tabs around the inner periphery of the semi-circular device could provide easy and secure installation by hand, whereas each tab could be fabricated of relatively thin metal as compared to the upper portion of the repair device, promoting easier bending of the tabs without tools. It should also be noted that FIGS. 3, 4 and 5 show tabs which are of less thickness than the upper portion (101) of the repair device, while FIGS. 1 and 2 show tabs of about the same thickness as the upper portion (101). These are embodiment options, which depend on the type and thickness of material use to fabricate the upper portion, and whether or not the bending of the tab is intended to be a tool-free hand operation or not.

Removal of the repair device, if ever desired, requires straightening of the tab(s) to align them in a co-planar direction with the upper portion, and then sliding the device in the opposite of the installation direction (115) of off the water closet flange (200). If two repair devices were used, the coupling hardware at the ends (108, 109) of the semi-circular devices may need to be removed or loosened prior to sliding, as well.

CONCLUSION

The foregoing exemplary embodiment(s) is/are intended to teach how to make and use the invention, but not to express the limits of the spirit and scope of the invention. In some embodiments, a disclosed singular element may be replaced by a plurality of elements, and vice versa, without departing from the spirit and scope of the invention. Alternative materials from those disclosed in the exemplary embodiments may be employed, so long as the function and intended performance is maintained or improved.

What is claimed is:

1. A water closet flange repair device comprising:
   a side portion of an arcuate shape of less than or equal to a semi-circle, having an outer circumference, and having a top edge and a bottom edge;
   an upper portion adjoining the side portion at a substantially right angle along at least a part of the top edge of the side portion, and having a first inner circumference less than the outer circumference of the side portion;
   a lower portion adjoining the side portion at a substantially right angle along at least part of the bottom edge of the side portion, and having a second inner circumference greater than the first inner circumference of the upper portion and less than the outer circumference of the side portion; and
   a slot formed through the upper portion, being shaped and dimensioned for receiving a closet bolt head;
   wherein the upper portion, side portion and lower portion define a rectangular channel having a pre-determined interior height to receive a water closet flange within the rectangular channel.

2. The water closet flange repair device as set forth in claim 1 further comprising one or more bendable tabs extending from the first inner circumference on the upper portion, each tab having a first position co-planar with the upper portion and having a second bent position thereby providing mechanical retention within an inside volume of a water closet flange captured within the rectangular channel.

3. The water closet flange repair device as set forth in claim 2 wherein one or more of the tabs further comprise a grub screw which, when advanced through the tab, makes contact with the captured water closet flange, thereby providing additional mechanical retention and reducing radial movement of the device around the captured water closet flange.

4. The water closet flange repair device as set forth in claim 1 wherein a hole formed through the upper portion, the side portion or the lower portion receives a grub screw which, when advanced through the hole, makes contact with a captured water closet flange, thereby providing additional mechanical retention and reducing movement of the device relative to the captured water closet flange.

5. The water closet flange repair device as set forth in claim 1 wherein the pre-determined interior height is nominally $7/16$th's inches for capturing PVC flanges.

6. The water closet flange repair device as set forth in claim 1 wherein the slot further comprises a T-shaped slot for receiving a head of a closet bolt.

7. The water closet flange repair device as set forth in claim 1 wherein the slot further comprises a hole for receiving a head of a closet bolt.

8. The water closet flange repair device as set forth in claim 1 further comprising two coupler ends, one disposed at each of two ends of the upper portion, side portion, lower portion, or a combination of the portions, configured to attach ends of another arcuate-shaped repair device.

9. A method of manufacture for a water closet flange repairer device comprising:
   forming an arcuate-shaped member having:

a side portion of an arcuate shape of less than or equal to a semi-circle, having an outer circumference, and having a top edge and a bottom edge;

an upper portion adjoining the side portion at a substantially right angle along at least a part of the top edge of the side portion, and having a first inner circumference less than the outer circumference of the side portion;

a lower portion adjoining the side portion at a substantially right angle along at least part of the bottom edge of the side portion, and having a second inner circumference greater than the first inner circumference of the upper portion and less than the outer circumference of the side portion; and a slot formed through the upper portion, being shaped and dimensioned for receiving a closet bolt head;

wherein the upper portion, side portion and lower portion define a rectangular channel having a pre-determined interior height to receive a water closet flange within the channel.

10. The method of manufacture as set forth in claim 9 further comprising providing one or more bendable tabs extending from the first inner circumference on the upper portion, each tab having a first position co-planar with the upper portion and having a second bent position thereby providing mechanical retention within an inside volume of a water closet flange captured within the rectangular channel.

11. The method of manufacture as set forth in claim 10 wherein one or more of the tabs further comprise a grub screw which, when advanced through the tab, makes contact with the captured water closet flange, thereby providing additional mechanical retention and reducing radial movement of the device around the captured water closet flange.

12. The method of manufacture as set forth in claim 9 further comprising forming a hole through the upper portion, the side portion or the lower portion, for receiving a grub screw which, when advanced through the hole, makes contact with a captured water closet flange, thereby providing additional mechanical retention and reducing movement of the device relative to the captured water closet flange.

13. The method of manufacture as set forth in claim 9 wherein the pre-determined interior height is nominally $7/16$th's inches for capturing PVC flanges.

14. The method of manufacture as set forth in claim 9 wherein the slot further comprises a T-shaped slot for receiving a head of a closet bolt.

15. The method of manufacture as set forth in claim 9 wherein the slot further comprises a hole for receiving a head of a closet bolt.

16. The method of manufacture as set forth in claim 9 further comprising providing two coupler ends, one disposed at each of two ends of the upper portion, side portion, lower portion, or a combination of the portions, configured to connect to two ends of another arcuate-shaped repair device.

\* \* \* \* \*